United States Patent [19]

Hostetter

[11] Patent Number: 5,460,878

[45] Date of Patent: Oct. 24, 1995

[54] HEAT SEALABLE SHRINK LAMINATE

[75] Inventor: Barry J. Hostetter, Wilmington, Del.

[73] Assignee: Applied Extrusion Technologies, Inc., Peabody, Mass.

[21] Appl. No.: 966,242

[22] Filed: Oct. 26, 1992

[51] Int. Cl.[6] ............................ B32B 31/26; B32B 27/32
[52] U.S. Cl. ...................... 428/349.1; 428/516; 428/910
[58] Field of Search ................................... 428/349, 516, 428/910

[56] References Cited

U.S. PATENT DOCUMENTS

| T981,003 | 4/1979 | Bartron et al. | 264/210 R |
|---|---|---|---|
| 3,510,549 | 5/1970 | Tsuboshima et al. | 264/95 |
| 3,753,828 | 8/1973 | Manne et al. | 156/333 |
| 4,032,493 | 6/1977 | Pascual | 260/28.5 A |
| 4,156,709 | 5/1979 | Kondo et al. | 264/171 |
| 4,190,168 | 2/1980 | Jacques | 215/12 R |
| 4,277,594 | 7/1981 | Matthews et al. | 526/352 |
| 4,335,069 | 6/1982 | Levy | 264/290.2 |
| 4,355,076 | 10/1982 | Gash | 428/411 |
| 4,390,385 | 6/1983 | Ferguson et al. | 156/229 |
| 4,430,289 | 2/1984 | McKinney et al. | 264/564 |
| 4,436,888 | 3/1984 | Copple . | |
| 4,533,509 | 8/1985 | Gust et al. | 264/171 |
| 4,608,284 | 8/1986 | Roales | 428/351 |
| 4,649,009 | 3/1987 | Shibata et al. | 264/235.8 |
| 4,704,173 | 11/1987 | Hoffman | 156/212 |
| 4,828,928 | 5/1989 | Shah | 428/518 |
| 4,844,957 | 7/1989 | Hoffman | 428/34.7 |
| 4,865,902 | 9/1989 | Golike et al. | 428/215 |
| 4,879,177 | 11/1989 | Boice | 428/339 |
| 4,911,976 | 3/1990 | Park et al. | 428/216 |
| 4,921,749 | 5/1990 | Bossaert et al. | 428/216 |
| 4,971,845 | 11/1990 | Aaker et al. | 428/34.9 |
| 4,977,002 | 12/1990 | Hoffman | 428/34.7 |
| 5,057,177 | 10/1991 | Balloni et al. | 156/244.11 |
| 5,091,237 | 2/1992 | Schloegl et al. | 428/215 |
| 5,128,212 | 7/1992 | Kneale et al. | 428/516 |
| 5,132,157 | 7/1992 | Asanuma et al. | 428/141 |
| 5,234,733 | 8/1993 | Schloegl | 428/349 |

FOREIGN PATENT DOCUMENTS

| 340579 | 4/1989 | European Pat. Off. . |
|---|---|---|
| 0498249A2 | 1/1992 | European Pat. Off. . |
| 49-86459 | 8/1974 | Japan . |
| 5519539 | 7/1978 | Japan . |
| 5551537 | 10/1978 | Japan . |
| 88062390 | 7/1980 | Japan . |
| 6362390 | 7/1980 | Japan . |
| 6405545 | 12/1980 | Japan . |
| 58-119827 | 7/1983 | Japan . |
| 59-9030 | 1/1984 | Japan . |
| 59-49958 | 3/1984 | Japan . |
| 62062846 | 9/1985 | Japan . |
| 62056117 | 9/1985 | Japan . |
| 92021192 | 10/1985 | Japan . |
| 63304032 | 6/1987 | Japan . |
| 01103441 | 10/1987 | Japan . |
| 1153430 | 11/1987 | Japan . |
| 1120339 | 11/1987 | Japan . |
| 2204048 | 4/1988 | United Kingdom . |

OTHER PUBLICATIONS

Krones Handbook of Package Decoration Technology, K. Dullinger and D. Kaye, Aug. 1988, pp. 50–53, 190–199.

T. E. Breuer et al., "Fatty Amide Slip and Antiblock Additives in Polypropylene and Linear Low Density Polyethylene", pp. 141–144, Conference Proceedings, Antec (Apr. 30–May 3, 1984).

Primary Examiner—Edith Buffalow
Attorney, Agent, or Firm—Caesar, Rivise, Bernstein, Cohen & Pokotilow, Ltd.

[57] ABSTRACT

A heat sealable laminate having high unidirectional shrinkage and the ability to produce an effective seal when exposed to an elevated temperature. The heat sealable laminates of the present invention are used to label containers without application of an additional adhesive.

38 Claims, 1 Drawing Sheet

HEAT SEALABLE SHRINK LAMINATE

FIELD OF THE INVENTION

The present invention is directed to polymeric shrink films and processes for producing polymeric shrink films. More particularly, the present invention is directed to polymeric shrink films using oriented polymeric films and laminates which are particularly advantageous in labeling articles, such as beverage containers, having irregular shapes.

BACKGROUND OF THE INVENTION

A distinguishing characteristic of shrink film is its capacity, upon exposure to some level of heat, to shrink or, if restrained, to create shrink tension within the film. When such a shrink film is used in a process to label or wrap a container, and then is subjected to certain temperature, this process causes the film to shrink around the product producing a tight, transparent or opaque, wrapping that conforms to the contour of the article and provides useful functions required of label or packaging materials.

The ability of a film to shrink upon exposure to some level of heat arises from the orientation of the film during manufacture. During film manufacture, the films are usually heated to their orientation temperature range, which varies with the different polymers used for the films, but is usually above room temperature and below the melting temperature of the polymer. The film is then stretched, either sequentially or simultaneously, in the longitudinal or machine direction (MD) and in the cross or transverse direction (TD) to orient it. After being stretched, the film is rapidly cooled, thus freezing the film in its biaxially oriented state. Upon heating, the orientation stresses are relaxed and the film will begin to shrink back to its original, unoriented dimension.

The polyvinyl chloride (PVC), polystyrene, polyester, and polyolefin families of shrink films provide a wide range of physical and performance film characteristics. Film characteristics play an important role in the selection of a particular film and may differ for each type of packaging or labeling application.

Polyolefins have been most successful with applications where moderate to high shrink forces are preferred. Polyolefin films are also used on automatic, high speed shrink wrapping equipment where shrink and sealing temperature ranges are more clearly controlled. Polyolefin films are particularly suitable for this application because polyolefin films tend to be cleaner, leaving fewer deposits and less residue, which extend the life of the equipment as well as reducing equipment maintenance.

The shrink films have been subjected to subsequent processing steps such as printing, metallizing, or laminating in order to fashion labels for use on containers. Typically, the shrink film is applied to the container to be labeled, and an amount of an adhesive is applied to the shrink film in order to produce tight smooth continuous seams. The application of adhesive to the shrink film is done after fabrication of the shrink film. Application of the adhesive must be accomplished with great care in order to preserve the aesthetics of the label produced from the shrink film. The application of the adhesive layer also is an additional step which may require an amount of time to develop green strength of the adhesive at the seam prior to subsequent processing of labels which high speed labeling and packaging operations may not be able to tolerate.

SUMMARY OF THE INVENTION

The instant invention is directed to a heat sealable shrink laminate comprising biaxially oriented polymer film having an imbalance of shrinkage consisting essentially of a machine direction (MD) shrinkage greater than a transverse direction (TD) shrinkage in a MD/TD ratio of at least 2:1 and a heat seal layer applied to a surface of the biaxially oriented film. The heat seal layer is capable of forming an effective seal at a sealing temperature less than or equal to a shrinking temperature which produces a MD shrinkage of 10% or less.

DETAILED DESCRIPTION OF THE INVENTION

Figure 1:
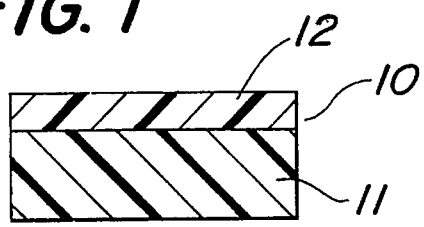
FIG. 1 is a depiction of an embodiment of the instant invention in cross-section.

The present invention is directed to a heat sealable shrink laminate comprising a biaxially oriented polymer shrink film on which is applied a heat seal layer, the process of making the heat sealable shrink laminate and articles such as cans bottles and the like, labeled or covered with the heat sealable shrink laminate.

Production of the biaxially oriented polymer shrink film having utility in the present invention is based on the control of temperature, machine draw parameters and film parameters that allow for regulation of resultant shrinkage of a biaxially oriented polymeric film. More particularly, by achieving a balance of temperature, draw ratio, line speed, and oriented polymer film properties, biaxially oriented polymeric films of utility in the present invention are able to produce enhanced machine direction (MD) shrinkage with a very low degree of transverse direction (TD) shrinkage. This balancing of MD and TD shrinkage, particularly in oriented polypropylene (OPP) films, imparts the unique shrink label and packaging characteristics to the present invention.

The MD re-orientation involves placing a conventional OPP film on a series of heated rolls or in an oven and, by raising the temperature of the heated rolls or oven to a temperature below the melting temperature of the film, the stress necessary to orient the film is reduced. For example, polypropylene begins to shrink near 100° C. and shrinkage continues to increase until melting at greater than about 160° C. The MD re-orientation can take place after the OPP film is produced or, in some cases, the re-orientation can take place in line while the OPP film is being produced. Most polymer products respond to this orientation with an enhanced high temperature shrinkage. The majority of the products' response is in the direction of the imposed strain.

The biaxially oriented polymer shrink film used in the instant invention is disclosed in U.S. patent application Ser. No. 07/651,966, incorporated herein by reference. The process for producing the biaxially oriented polymer shrink film involves subjecting a biaxially oriented polymer film to processing conditions and temperature effective to produce biaxially oriented polymer shrink films having thermal shrink properties including shrinkage in the machine direction of the film and transverse direction of the film as a function of the MD reorientation mechanical MD/TD draw ratio. The conditions include an MD reorientation mechanical MD/TD draw ratio between about 1.01 and about 7.5, preferably 1.01 to 1.5, more preferably 1.10 to 1.40. The MD reorientation mechanical draw ratio is defined herein as the ratio of the maximum to minimum roll speed of a machine performing the MD reorientation of the biaxially oriented polymer film in the formation of the biaxially oriented polymer shrink film. Preferably, the biaxially oriented polymer shrink film of the present invention has a film reorientation MD/TD mechanical draw ratio within the range of about 1.01 to about 1.5. Preferably the reorientation MD/TD mechanical draw ratio is within the range of about 1.1 to about 1.37; more preferably, the reorientation MD/TD mechanical draw ratio is within the range of about 1.12 to about 1.35.

The conditions also include a corresponding line speed comprising an input roll speed within the range of about 200 ft/min to about 1,500 ft/min and an output roll speed within the range of about 201 ft/min to about 1,501 ft/min. More preferably, the MD reorientation mechanical MD/TD draw ratio is between about 1.10 and 2.00 and the corresponding input roll speed is within the range of about 750 ft/min to about 850 ft/min. The output roll speed is within the range of about 935 ft/min to about 1500 ft/min, and most preferably wherein the input roll speed is about 800 ft/min and the output roll speed is within the range of about 1100 ft/min to about 1300 ft/min.

The basic processes for producing biaxially oriented polymer shrink films for use in accordance with the present invention may be selected from the group of conventional processes for producing biaxially oriented polypropylene (BOPP) films, such as the tubular and tenter techniques.

In general, in the tubular or bubble process, molten polymer is extruded from an annular die and then quenched to form a tube. The wall thickness of the tube is controlled partly by the annular die gap and partly by the relative speeds of extrusion and haul-off. The tube passes through slow running nip rolls and is then re-heated to a uniform temperature. Transverse drawing is achieved by increasing the air pressure in the tube, the draw ratio, and/or by adjustments to the volume of entrapped air. The air is trapped by pinch rolls at the end of the bubble remote from the extruder and these are generally run at a faster speed than the first pair, thus causing drawing of the film in the machine direction. The tubular process thus obtains simultaneous transverse and forward orientation.

In the second of the previously mentioned processes, i.e., the tenter process, the polymer is extruded through a slot die and quenched. The extruded sheet is normally oriented in two sequential steps. The first step is usually longitudinal orientation between rolls running at different speeds. In the second stage, the film enters a tenter frame, where it is stretched laterally by means of diverging chains of clips. Whereas the bubble process operates at constant pressure, the tenter frame process operates at a constant rate of elongation. Somewhat higher stretching forces are required in the second stage which may be carried out at slightly higher temperatures. This is mainly due to crystallization of the film during the first stretching operation. The tenter frame process can also be carried out as a simultaneous operation in which an extruded sheet with beaded edges is biaxially oriented in a tenter frame equipped with diverging roller grips for holding and stretching the film.

The tenter or tenter frame operation has the advantage of considerable versatility, producing films with a wide range of shrink properties.

After stretching, polymer orientation is locked into the oriented film by cooling. When the oriented film is subsequently heated up to temperatures in the vicinity of the stretching temperature, the frozen-in stresses become effective and the film shrinks. Strains and stresses which are related to the degree of orientation and the forces which are applied during stretching are thereby recovered.

The biaxially oriented polymer shrink film is produced by subjecting a biaxially oriented polymer film to processing conditions and temperatures effective to produce biaxially oriented polymer shrink films having thermal shrink properties including shrinkage in the machine direction of the film and transverse direction of the film as a function of temperature, wherein the processing temperature is within the range of about 70° C. to about 160° C., preferably within a range of about 90° C. to about 130° C., and more preferably within the range of about 100° C. to about 120° C.

Preferably, the heated biaxially oriented film is drawn under conditions effective to extend the heated biaxially oriented film at least 1.10 times its original length in the machine direction; and cooling the drawn film while the film is still under tension, whereby a biaxially oriented polymeric shrink film is produced with thermal shrinkage properties being a function of temperature.

For purposes of the present invention, and particularly for shrink films and laminates thereof used to label articles in accordance with the present invention, MD shrinkage is greater than about 10%, preferably greater than about 15%, more preferably greater than about 20% at 140° C.

For purposes of the present invention, the biaxially oriented polymer shrink film may be selected from the group consisting of clear films and opaque films; the biaxially oriented polymer shrink film may also be selected from the group consisting of monolayer films, multilayer films, coextruded films, extrusion coated films and coated films. Biaxially oriented polymer shrink films of utility in the present invention are composed of polyolefins, such as polypropylene. Preferably, the biaxially oriented polymer shrink film has a thickness within the range of about 50 to about 200 gauge, and more preferably within the range of about 70 to about 140 gauge.

The thermal shrink properties of the biaxially oriented polymer shrink films and laminates of utility in the present invention differ from conventional oriented polymer films while still maintaining the useful characteristics of oriented polymer film. Thermal shrink properties of the biaxially oriented polymer films of utility in the present invention are characterized by shrinkage in the machine direction (MD) and transverse direction (TD) as a function of temperature.

It is critical that the biaxially oriented polymer shrink film manifest a resistance to MD alteration in dimension during typical label preparation and application to maintain uniform repeat length and registration as imparted by applied heat/or tension history. The biaxially oriented polymer shrink film also must be resistent to MD and/or TD lamination curl to maintain uniform lamination flatness. The biaxially oriented polymer shrink film should maintain overall web flatness, as exhibited by typical oriented polyolefin films, as well as single web or lamination stiffness as required for conventional printing, laminating, and label-to-container feeding operation.

The MD re-orientation of BOPP film is more complex than for conventional films due at least in part to initial residual stresses placed on the film. For example, in accordance with the present invention, it has been discovered that at a 140° C. shrink temperature, BOPP films may shrink 15% in the machine direction (MD) or transverse direction (TD). After this same film is subjected to a film reorientation MD/TD mechanical draw ratio, a 5–30% transverse direction reduction in film width results and 140° C. film shrinkage is biased in the MD direction, i.e. 140° C. MD shrinkage equals 25% and 140° C. TD shrinkage equals 5%.

For purposes of the present invention, the following procedure, derived from ASTM method D2732-83, which is designed to measure unrestrained linear shrinkage in both the machine and transverse directions, was used for measuring unrestrained linear thermal film shrinkage in a single direction at a time.

A polydimethylsiloxane fluid bath, having a viscosity of 0.5 centistokes (cs), is preheated to desired temperatures within the range of about 100° C. to 140° C.

Film samples are precut to 0.5"×22 cm and a 20 cm span is marked in the sample center. Ends are left on a film sample so the film sample can be anchored for immersion. One end of each film sample is placed in an immersion rack. A 1.2 g metal alligator clip is attached to a free long end of each film sample to keep the film sample from floating in the bath. The machine direction and the transverse direction are tested for each film sample. The heater/stirrer is then turned off and the film samples on the rack are immersed into the proper temperature bath for a count of five seconds prior to being removed from the liquid. The film samples are immediately measured and their % shrinkage calculated. For example, with a film sample having a 20 cm span, a shrinkage of 1 mm equals 0.5% shrinkage. The average % shrinkage of all the film samples run in one direction (MD or TD) is then recorded for a particular film sample. If there is an elongation rather than a shrinkage, a negative value is reported.

Thermal shrink properties of the biaxially oriented polymer shrink films of utility in the present invention are characterized by shrinkage in the machine direction (MD) and transverse direction (TD) as a function of temperature. These shrink characteristics are outlined as follows: t,0130

The thermal shrink properties, combined with the tensile properties of the biaxially oriented polymer shrink films of utility in the present invention allow for the useful practice of using conventional labeling equipment.

The tensile properties of the biaxially oriented polymer shrink film are characterized as follows: t,0131

The tensile strength, elongation and modulus were measured using the ASTM D882 test procedure.

The processes of the present invention, as described with respect to herein for producing heat sealable shrink laminate and resultant shrink film layers and laminates are polyolefin films such as polypropylene. In this regard, the polypropylene character of the film is preferably a homopolymer, although copolymers of propylene with minor amounts of ethylene or an alpha-olefin and the respective blends can also be used. Typical commercially available film-forming propylene homopolymers are crystalline or isotactic in their molecular structure and normally have a melt flow rate of about 2 to 10 dg/min. Conventionally, the polypropylene is compounded with conventional additives such as anti-oxidants, light stabilizers, inorganic antacids, such as calcium oxide or magnesium aluminum hydroxide carbonate hydrate in addition to fatty acid amide slip agents.

In accordance with the present invention, biaxially oriented polymer shrink films can be a single web or formed into a laminate, with use as a laminate being particularly beneficial.

For purposes of the present invention, any conventional lamination process may be used inasmuch as the biaxially oriented polymer shrink films have been observed to be capable of being suitably laminated using known technology, e.g., selected from the group consisting of wet bonding, dry bonding, hot melt or wax laminating, extrusion lamination, and thermal or heat laminating; however, dry bonding and thermal or heat laminating are preferred.

Dry bonding involves applying adhesive to one of the films or webs. The solvent is evaporated from the adhesive and the adhesive-coated web is combined with the other web material by heat and pressure or by pressure only.

Thermal laminating brings together coated substrates under heat and pressure. Typically, the webs are heated to the softening point of the coating; however, improved results, e.g. in clarity, are obtained when using preheat rolls and a steam box.

Related to this, labels are normally printed and the printing is expected to be permanent. If the exposed printed surface is abraded, then the printing can be removed or scuffed. If, however, the printing is on the inside surface of a clear film and this clear film is laminated to another film, the printing is protected by the clear film. Alternatively, the printing can be on the inside surface of the clear or opaque web laminated to the clear protective overweb. In addition, the outermost surface of the laminate can be made matte, glossy, of low coefficient of friction, different in surface tension or composition, independent from the nature of the surface required to accept inks. Also, the adhesion of the printed film to a container can be influenced by the presence of ink. For example, a typical failure of a film-to-container bond will occur by separation at the weakest point or at the ink from the film, with no failure of the adhesive. By placing the ink between the layers of a laminated film this weak point is removed, allowing for the adhesive to bond directly from laminate surface to the container. Printing can also be applied to a clear film layer and either a clear or opaque film, or a metallized version of either type of film, can be laminated to the printed web. For purposes of the present invention, biaxially oriented polymer shrink films may be printed using conventional printing techniques including flexographic printing and rotogravure printing.

Flexographic printing procedures typically employ presses selected from the group consisting of stack, central-impression, and in-line presses; flexographic printing which employs a central impression or common impression plate is preferred.

Plate preparation for flexography involves taking the art work through standard engraving procedures to form a zinc plate. At this point, a phenolic resin negative of the zinc plate is made from which the rubber positive of the zinc plate can be formed by standard molding methods using 0.0125-inch-thick rubber sheeting formulated for platemaking. Alternately, photosensitive glass and plastics, may be used instead of the zinc plates.

A typical method of mounting the plate employs a pressure sensitive material to adhere the rubber plate to the plate cylinder; vulcanizing the rubber plate to a metal brace that can be clamped around the plate cylinder may also be used for this purpose.

A conventional flexographic press consists of four sections: An unwind station for the web to be printed, a printing section, a drying oven, and a windup for the finished printed web.

The unwind section provides for the mounting of two additional rolls and a flying splice mechanism that allows for automatic splicing of the new roll to the expiring roll going through the press. Similarly, the windup section is provided with multiple windup spindles, usually two, and a mechanism for cutting the web when the roll on one spindle has reached a desired size and for attaching the free end to a core mounted on the second spindle for continuous output.

Web tension has a definite effect on print register and on slit roll quality, and particularly on central-impression flexographic presses, the web should be pulled tight around the central drum to eliminate wrinkles or flatness deficiencies.

Drying is performed with high-velocity hot air generated by gas burners, distribution ducts, and between-color dryers. The latter are a major aid in trapping the ink laid down in one color station before the next color is printed. This prevents the new color from causing the previous color to smear.

Drying temperature should be as high as possible to ensure best solvent removal; however, drying temperature should not be high as to cause film shrinkage. A suitable manner for determining proper temperature is to increase heat until film shrink begins, i.e., 2 to 5%, and then back off 5° F. For purposes of the present invention, web temperature is preferably approximately 170° F.; although the printing process may run at a slightly higher drying temperature.

The rotogravure process uses a metal cylinder printing member into which the design to be printed has been etched. Rotogravure equipment resembles an in-line flexographic press in that it, too, requires an unwind, a printing section, a dryer, and a rewind. However, each color station has a dryer designed to dry one color completely.

A typical rotogravure color unit includes an impression roll, a printing (engraved) cylinder or roll, an ink supply, e.g. an ink pen or fountain, and a doctor blade. The printing cylinder rotates in the ink fountain, picking up excess ink. The doctor blade, which oscillates parallel to the axis of the printing cylinder to prevent accumulation of dirt behind the blade that can cause streaks, removes the excess, permitting ink to remain only in the cells of the engraved part of the roll, since the bottom of the cells are below the surface of the cylinder. The impression cylinder, which is rubber covered, squeezes the web to be printed against the engraved roll, causing the web to remove ink from the engraving as it leaves the nip, thus accomplishing transfer of ink from the printing cylinder to the moving web. In flexography, the printing is done by a molded rubber plate using a metal impression roll. In rotogravure, the printing plate is an engraved metal roll and the impression roll is rubber covered.

A typical rotogravure press arrangement also includes two color stations, although eight color presses that can print several-tone cylinders and line cylinders, e.g., for type and can apply an overall high-gloss lacquer in-line are also typical. Rotogravure presses may also having flying splice unwinds with precise tension controls.

The process of using the biaxially oriented polymer shrink films to produce laminates which are applied to an article in accordance with the present invention has been discovered to overcome the previously mentioned disadvantages. In this regard, the present invention allows for a single printing operation to produce as many as four laminate variations. Also, shrinkable webs with different shrinkage properties can be laminated to a common printed shrinkable web to give laminates with different shrinkage properties tailored to the particular container or the requirements of the application. In addition, shrinkable webs of different shrinkage properties can also be laminated together to give a laminate whose shrinkage properties might be difficult to achieve using only a single film.

The character of a polymer surface can be changed in several ways. One method is to expose the surface to an energy source, such as a corona discharge, plasma, or an x-ray or electron bombardment. This can be done over a broad temperature range in an inert atmosphere or reactive atmosphere. Depending on the temperature, intensity, rate of application, and frequency of the energy and the nature and concentration of the chemical medium in contact with the surface before, during, and/or after energy application, a wide range of physical and/or chemical modifications of the film surface can be effected.

A second way to change a polymer surface is to cause an internal chemical additive to bloom to the surface by the application or removal of heat from the film. Alternatively, a substance on the surface of the film can be made to migrate inside of the film and away from the surface by the application or removal of heat from the film. The chemical nature of the substance or additive and the time/temperature history to which it is exposed can lead to a wide range of possible surface modifications.

A third way to change a polymer surface is to cause a change in surface morphology by the application of heat and/or pressure to the film. The physical and topological nature of the surface can be altered, for example, by annealing a film and changing the crystalline structure present on the film surface.

The biaxially oriented polymer shrink film may be composed of two or more polymer shrink films. Each polymer shrink film may function on its own as a heat shrinkable label or each polymer shrink film may be clear or opaque, metallized or non metallized, have similar or dissimilar surface character and shrinkage properties. In these embodiments, each polymer shrink film is preferably composed of polypropylene, a copolymer of polypropylene or a blend of polypropylene and a copolymer of polypropylene. Each polymer shrink film is preferably biaxially oriented, providing high strength in all directions of the film plane, unlike uniaxially oriented films which are strong in the orientation direction but weak in the perpendicular direction.

On a surface of the biaxially oriented polymer shrink film is a heat seal layer. Heal seal layers of utility in the present invention are capable of forming a effective seal at a sealing temperature less than or equal to a shrinking temperature which produces a MD shrinkage of 10% or less in the biaxially oriented shrink film. Heat seal layers of utility in the present invention have thicknesses from 1 to 20 gauge, preferably from 2 to 10 gauge.

In order to determine if a seal is "effective", the following procedure is performed. A pair of laminates having surfaces to be sealed are superimposed on one another so that the heat seal layers to be sealed are in contact with one another and placed in a sealing device. The sealing device has an upper heated metal jaw which is capable of pressing against a resilient anvil. The resilient anvil is not heated. Both the upper metal jaw and the resilient anvil are covered with non-stick surface, such as a polytetrafluoroethylene covered glass tape, in order to prevent sticking of either the upper heated metal jaw or the resilient anvil surfaces to the laminate after the seal has been formed. The sealing device is capable of producing a seal one inch in width. A Fin seal or a Lap seal may be produced using the above-described sealing device. Laminates are subjected to a temperature and 20 psi of applied pressure within a 0.5 second time period to fuse the laminates together thereby producing a seal.

The previously produced seal is subsequently tested using

ASTM standard test method F 88-85, "Standard Test Method for Seal Strength of Flexible Barrier Materials". Seals which are 50 g/in or more on a Fin Seal and 100 g/in or more on a Lap Seal are considered "effective". The temperature of the pair heated metal platens at which an "effective" seal is produced for a particular laminate is defined herein as the "sealing temperature" of that laminate.

The heat seal layer may be applied to the biaxially oriented polymer shrink film through coating techniques, laminating techniques or through coextrusion techniques. Also, the heat seal layer may be applied after the formation of the biaxially oriented polymer shrink film or prior to its formation by applying the heat seal layer to the biaxially oriented polymer film.

The heat seal layer may be of any polymer composition known to those of ordinary skill in the art for sealing films. Preferably, the heat seal layer is composed of alpha-olefins, more preferably composed of copolymers of propylene and ethylene, still more preferably composed of terpolymers of propylene, butene and ethylene.

The heat seal layer may be either clear or opaque. The heat seal layer may contain additives commonly known in the art, including but not limited to, stabilizers, antioxidants, coefficient of friction modifiers, and fillers.

Referring now to FIG. 1, an embodiment of the heat sealable shrink laminate of the instant invention 10 is depicted in cross-section. The biaxially oriented polymer shrink film 11 is depicted with the heat seal layer 12 applied to one of its surfaces. This embodiment is of a two-layer laminate.

Figure 2:
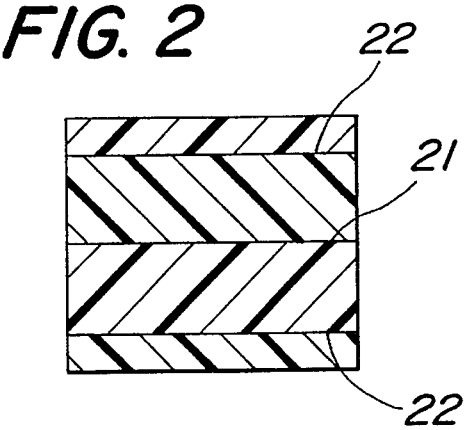
FIG. 2 is a depiction of another embodiment of the instant invention in cross-section.

Referring now to FIG. 2, another embodiment of the heat sealable shrink laminate of the instant invention is depicted in cross-section. This embodiment is of a four-layer laminate 20 where two biaxially oriented polymer shrink film are attached to one another at one surface 21 while two heat seal layers are arranged on a second surface 22.

Figure 3:
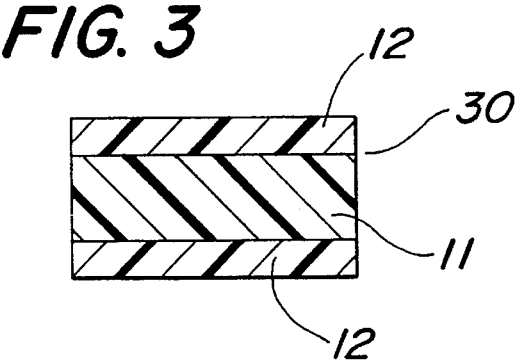
FIG. 3 is a depiction of another embodiment of the instant invention in cross-section.

Referring now to FIG. 3, another embodiment of the heat sealable shrink laminate of the instant invention is depicted in cross-section. This embodiment is of a three-layer laminate 30 where one biaxially oriented polymer shrink film 11 has a heat seal layer 12 attached to each of its surfaces.

The process according to the present invention may be further appreciated by reference to the following examples which are only representative of the present invention and in no way are meant to limit the present invention in any way to the particulars which are disclosed. Thus, the following are given merely as non-limiting examples to further explain the present invention.

EXAMPLES

Example 1

(Two-Layer Laminates)

Using the method described in U.S. patent application Ser. No. 07/651,966 incorporated herein by reference, films composed of polyolefins in both clear and opaque formulations were produced. The above films had coextruded heat seal layers. Formulations of the various heat seal layers are as follows: Formulation A is a copolymer of propylene and ethylene, (Z9470HB available from Fina Chemical Company); Formulation B is a copolymer of propylene and ethylene, (8573 or 8573HB available from Fina Chemical Company); and Formulation C is a terpolymer of propylene, butene and ethylene, (W.S.709-S4 available from Sumitomo Chemical Company).

Each of the films were biaxially oriented using conventional techniques. The films were subjected to a secondary orientation in the MD according to the teachings of U.S. patent application Ser. No. 07/651,966.

The resulting products were two-layer embodiments of the instant invention. These laminates are listed in Table 1. The shrinkage properties of the above-identified laminates are found in Table 2. t,0230 t,0240

Example 2

(Four-Layer Laminates)

Two-layer laminates of example 1 were subsequently laminated to one another with the heat seal layers arranged on the outside surface of the resultant laminates, and the biaxially oriented polymer shrink films positioned in a superimposed arrangement with each other. The two laminates were adhered to one another using a dry bond lamination technique.

Shrinkage properties of the above-identified four-layer laminates are found in Tables 3A and 3B. Strength of seals produced from the above-identified four-layer laminates are found in Table 4 and 5. t,0260 t,0270 t,0280 t,0290

Novel heat sealable shrink laminates in accordance with the present invention have been discovered to be particularly advantageous in labeling articles having irregular shapes. For purposes of the present invention, the article may be a straight-walled or contoured aluminum, steel, metal, plastic, glass, composite, or tubular or spiral wound cardboard container (especially a can or tin) for beverages (especially soda and beer), foods, or aerosols.

In this regard, either a single laminate or multiple laminate layers of novel heat sealable shrink laminates in accordance with the present invention is capable of being heat shrunk onto an article, such as a beverage can, the upper and bottom parts of which are tapered inwardly. The novel heat sealable shrink laminates and laminates of novel heat sealable shrink laminates in accordance with the present invention are particularly advantageous in labeling more modern beverage cans which taper inwardly at the upper and lower extremities so that a label must either avoid extending to these extremities or must conform closely to the shapes thereof: for example, in accordance with the procedures disclosed in U.S. Pat. No. 4,844,957, the disclosure of which is hereby incorporated herein in its entirety by reference thereto.

To prepare the embodiment of the present invention, incoming packages are spaced by an infeed worm and transferred, via the infeed star, to a central rotary carousel. Here, firmly located between a base platform and overhead centering bell, they are caused to rotate about their own axes. As a label is withdrawn laterally from a magazine, it is wrapped around the circumference of the article and cut to a desired length. A means for sealing the heat sealable shrink laminate, such as a heater bar, applies sufficient heat and pressure to fuse the heat seal layer thereby producing a seal, usually in the form of an overlap bond. The seal is formed at or above the "sealing temperature" but below a "shrinking temperature" which is defined as the temperature required to conform or shrink the heat sealable shrink laminate to the profile of the article being labeled. The article is subsequently exposed to a temperature at or above the "shrinking temperature" causing the heat sealable shrink laminate to conform to the profile of the article and thereby producing fully labeled article.

The fully labelled articles are then transferred, via the discharge star-wheel, to the down-stream conveyor. The size of the label is such that it extends (top and bottom) beyond the cylindrical portion of the bottle or can. After labelling, bottles or cans are passed through a heating sector to ensure the upper and lower label areas shrink tightly and uniformly to the bottle contours. For purposes of the present invention, it has been discovered that hot air preferably should be directed towards the top and bottom of the label or other specific area of the labelled container where a non-uniform contour is located to allow preferential shrinkage of the heat shrink label in these areas.

In contrast to the present invention, none of the conventional labels or other known labels have been observed to be as suitable for labeling of irregularly shaped beverage containers, and other irregularly shaped articles, as contemplated in accordance with the present invention. For example, conventional labels have been observed to distort during the process of applying the same to irregular shaped articles, for example by heat shrinking. More importantly, however, such conventional labels, and particularly laminated labels, do not readily conform to the irregular shape of the article, for example, especially at the tapered extremes of beverage containers, such as cans.

Figure 4:
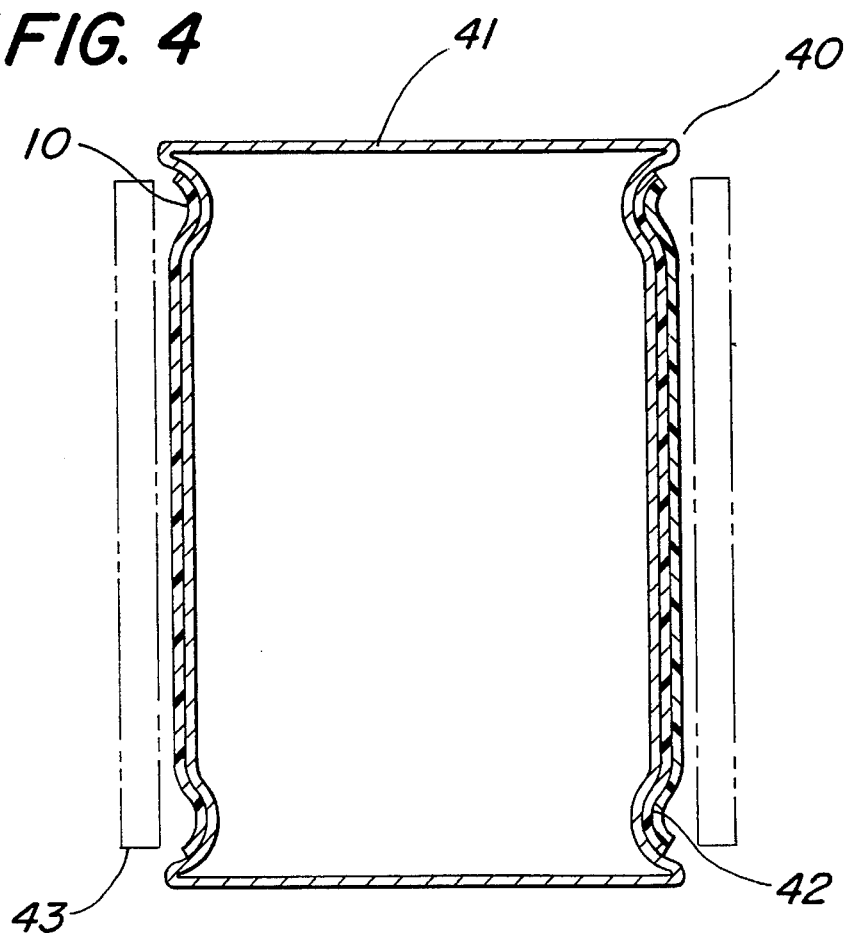
FIG. 4 is depiction of labeled article in cross-section.

Referring now to FIG. 4, a labeled article of the instant invention 40 is depicted in cross-section. The heat sealable shrink laminate 10 is depicted as conforming to the profile of the labeled article, in this case a beverage can 41. A seam 42 can be seen also conforming to the profile of the labeled article. The position of the heat shrink laminate in an non-shrunken state 43 prior to exposure to shrinking temperature is depicted in phantom.

Thus, in accordance with the present invention, an irregular shape article, such as a beverage container, which includes a cylindrical wall of metal, glass, or plastic and a top and a bottom on the wall, wherein the wall tapers inwardly adjacent to the top/bottom to form top and bottom tapered portion is provided with a heat shrinkable layer, or laminated layers of novel heat sealable shrink laminate produced in accordance with the present invention, to encircle the wall and conform to the tapered portions, for example, as disclosed in U.S. Pat. Nos. 4,704,173 and 4,844,957 which teach apparatus and methods for applying heat seal labels to articles, the disclosures of which are hereby incorporated in their entireties by reference thereto herein. Preferably, the label comprises first and second layers in laminated relationship.

Although the invention has been described with reference to particular means, materials and embodiments, from the foregoing, one skilled in the art can easily ascertain the essential characteristics of the present invention; and various changes and modifications may be made to various usages and conditions without departing from the spirit and scope of the invention as described in the claims that follow.

I claim:

1. A heat sealable shrink laminate comprising:
    a) biaxially oriented polymer shrink film consisting essentially of a machine direction (MD) shrinkage of greater than a transverse direction (TD) shrinkage such that TD is less than or equal to MD/2 and wherein the MD shrinkage is greater than about 15% at about 140° C.; and
    b) a heat seal layer applied to a surface of the biaxially oriented film;
    wherein the heat seal layer is capable of forming an effective seal at a sealing temperature less than or equal to a shrinking temperature which produces a MD shrinkage of 10% or less in the biaxially oriented heat sealable shrink laminate.

2. The heat sealable shrink laminate of claim 1, wherein said MD shrinkage and said TD shrinkage are functions of temperature as follows: t,0320

3. The heat sealable shrink film of claim 1, wherein said biaxially oriented polymer shrink film is composed of polyolefins.

4. The heat sealable shrink laminate of claim 3, wherein the biaxially oriented polymer shrink film is composed of polypropylene.

5. The heat sealable shrink laminate of claim 1, wherein the biaxially oriented polymer shrink film is selected from the group consisting of clear films and opaque films.

6. The heat sealable shrink laminate of claim 1, wherein the biaxially oriented polymer shrink film is selected from the group consisting of monolayer films, multilayer films, coextruded films, extrusion coated films and coated films.

7. The heat sealable shrink laminate of claim 1, wherein the biaxially oriented polymer shrink film has a thickness within the range of about 50 to 200 gauge.

8. The heat sealable shrink laminate of claim 7, wherein the biaxially oriented polymer shrink film has a thickness within the range of about 70 to 140 gauge.

9. The heat sealable shrink laminate of claim 1, wherein the heat seal layer comprises an alpha-olefin.

10. The heat sealable shrink laminate of claim 9, wherein the heat seal layer comprises a copolymer of propylene and ethylene.

11. The heat sealable shrink laminate of claim 9, wherein the heat seal layer comprises a terpolymer of propylene, butene, and ethylene.

12. The heat sealable shrink laminate of claim 1, wherein the heat seal layer is applied through a process selected from the group consisting of coating processes, lamination processes and extrusion processes.

13. A method for producing a heat sealable shrink laminate comprising the steps of:
    a) obtaining a biaxially oriented polymer heat sealable shrink film consisting essentially of a machine direction (MD) shrinkage of greater than a transverse direction (TD) shrinkage such that TD is less than or equal to MD/2 and wherein the MD shrinkage is greater than about 15% at about 140° C.;
    b) applying a heat seal layer to a surface of the biaxially oriented film;
    wherein the heat seal layer is capable of forming an effective seal at a sealing temperature less than or equal to a shrinking temperature which produces an MD shrinkage of 10% or less in the biaxially oriented heat sealable shrink laminate.

14. The method for producing a heat sealable shrink laminate as in claim 13, wherein said MD shrinkage and said TD shrinkage are functions of temperature as follows: t,0330

15. The method for producing a heat sealable shrink laminate as in claim 14, wherein the biaxially oriented polymer shrink film is composed of polyolefins.

16. The method for producing a heat sealable shrink laminate as in claim 15, wherein the biaxially oriented polymer shrink film is composed of polypropylene.

17. The method for producing a heat sealable shrink laminate as in claim 13, wherein the biaxially oriented polymer shrink film is selected from the group consisting of clear films and opaque films.

18. The method for producing a heat sealable shrink laminate as in claim 13, wherein the biaxially oriented polymer shrink film is selected from the group consisting of monolayer films, multilayer films, coextruded films, extrusion coated films and coated films.

19. The method for producing a heat sealable shrink laminate as in claim 13, wherein the biaxially oriented polymer shrink film has a thickness within the range of about 50 to 200 gauge.

20. The method for producing a heat sealable shrink laminate as in claim 19, wherein the biaxially oriented polymer shrink film has a thickness within the range of about 70 to 140 gauge.

21. The method for producing a heat sealable shrink laminate as in claim 13, wherein the heat seal layer comprises an alpha-olefin.

22. The method for producing a heat sealable shrink laminate as in claim 13, wherein the heat seal layer comprises a copolymer of propylene and ethylene.

23. The method for producing a heat sealable shrink laminate as in claim 13, wherein the heat seal layer comprises a terpolymer of propylene, butene, and ethylene.

24. The method for producing a heat sealable shrink laminate as in claim 13, wherein the heat seal layer is applied through a coating process.

25. The method for producing a heat sealable shrink laminate as in claim 13, wherein the heat seal layer is applied through a lamination process.

26. The method for producing a heat sealable shrink laminate as in claim 13, wherein the heat seal layer is applied through an extrusion process.

27. A labeled article comprising: an article having a wall, and a layer of shrink film encircling the article wherein the shrink film comprises;

a) a biaxially oriented polymer shrink film having an imbalance of shrinkage consisting essentially of a machine direction (MD) shrinkage of greater than a transverse direction (TD) shrinkage such that TD is less than or equal to MD/2 and wherein the MD shrinkage is greater than about 15% at about 140° C.; and b) a heat seal layer applied to a surface of the biaxially oriented film;

wherein the heat seal layer is capable of forming an effective seal at a sealing temperature less than or equal to a shrink temperature which produces a MD shrinkage of 10% or less in the biaxially oriented shrink film.

28. The labeled article of claim 21 wherein the article is a can.

29. The labeled article of claim 21 wherein the article is a bottle.

30. The heat sealable shrink laminate of claim 1, wherein the biaxially oriented polymer shrink film has the following tensile properties:

Tensile Properties

Modulus (psi)
  MD 350,000 to 850,000
  TD 100,000 to 500,000
Tensile Strength (psi)
  MD 10,000 to 50,000
  TD 10,000 to 40,000
Ultimate Elongation (%)
  MD 20 to 175
  TD 50 to 250.

31. The heat sealable shrink laminate of claim 1, wherein the heat seal layer has a thickness of from 1 to 20 gauge.

32. The heat sealable shrink laminate of claim 31, wherein the heat seal layer has a thickness of from 2 to 10 gauge.

33. The heat sealable shrink layer of claim 1, wherein biaxially oriented polymer shrink film is produced by an md reorientation mechanical MD/TD ratio between 1.01 to 7.5.

34. The heat sealable shrink layer of claim 33, wherein biaxially oriented polymer shrink film is produced by an MD reorientation mechanical MD/TD ratio between 1.01 to 1.5.

35. The heat sealable shrink layer of claim 34, wherein biaxially oriented polymer shrink film is produced by an MD reorientation mechanical MD/TD ratio between 1.10 to 1.40.

36. The heat sealable shrink layer of claim 1, wherein biaxially oriented polymer shrink film has a MD shrinkage of 10% or greater at about 140° C.

37. The heat sealable shrink layer of claim 36, wherein biaxially oriented polymer shrink film has a MD shrinkage of 15% or greater at about 140° C.

38. The heat sealable shrink layer of claim 37, wherein biaxially oriented polymer shrink film has a MD shrinkage of 20% or greater at about 140° C.

* * * * *